United States Patent Office 2,991,275
Patented July 4, 1961

2,991,275
HYDROCARBON RESINS PRODUCED USING CYCLOPARAFFINIC DILUENT

Morton Fefer, Metuchen, N.J., assignor to Esso Research and Engineering Company, a corporation of Delaware
No Drawing. Filed Oct. 31, 1958, Ser. No. 770,940
6 Claims. (Cl. 260—82)

This invention relates to the preparation of improved petroleum resins from steam-cracked petroleum streams. More particularly, it relates to a process for preparing resins from steam-cracked light naphtha streams wherein the formation of undesirable insoluble polymer is minimized and the resin quality is improved by carrying out the polymerization in the presence of a cycloparaffinic diluent.

Until recently, the petroleum resins of the general type described herein have been produced largely from the steam-cracked heavier petroleum fractions boiling in the range of about 250° to 700° F., such as heavy naphtha, kerosene, gas oil, and the like. These heavier fractions are cracked in the presence of 50–90 mol percent steam at temperatures of about 1000° to 1500° F. to give highly unsaturated products. The liquid cut boiling from about 60° F. up to 400° F. and higher, containing large proportions of $C_5$ to $C_9$ olefins and diolefins, is then polymerized over a Friedel-Crafts catalyst to produce the desired petroleum resins. The preparation of such resins has been described in U.S. Patent 2,734,046 and other patents.

Now, however, light naphthas are used frequently as steam-cracking feed stocks in place of the heavier naphthas, gas oils and the like. While the steam cracking of such light naphthas has been quite successful in producing ethylene, butadiene, and the like, there has been considerable difficulty in the preparation of high quality petroleum resins from the $C_5$—250° F. fraction obtained from such steam-cracked light naphthas. It has previously been found that the only steam-cracked light naphtha cut attractive for resin production is the $C_5$ or $C_5$–$C_6$ fraction boiling from about 60° to 120° F. The preparation of satisfactory resins from such a cut has been described in copending applications Serial Nos. 627,090 and 734,055.

However, even when the $C_5$ or $C_5$–$C_6$ cut is used as the resin feed, there is usually formed during the polymerization an insoluble polymer, or "gel," which makes recovery of the resin product difficult. This gel in the reaction mixture also adversely affects the color, clarity, and other properties of the resin. This gel formation is especially serious in a continuous process, where it causes plugging of the piping in the circulating system.

It is an object of this invention to provide a method for preparing high quality petroleum resins with a minimum of insoluble polymer formation. Another object is to provide a method for preparing petroleum resins of high softening point. It is a further object to provide an efficient continuous process for preparing high quality petroleum resins from steam-cracked light naphtha fractions.

It has now been found that gel formation can be greatly inhibited and the resin softening point improved by polymerizing the $C_5$ or $C_5$–$C_6$ steam-cracked light naphtha fraction in the presence of a cycloparaffinic hydrocarbon diluent. The cycloparaffinic hydrocarbons which have been found to inhibit gel formation include cyclopentane, cyclohexane, cycloheptane, and the alkyl substituted homologs thereof. Cyclohexane is the preferred diluent.

The diluent may be employed in amounts varying from 5 to 50 wt. percent based on the resin feed. Optimum results are obtained with 10 to 30% of diluent.

Either "direct addition," where the polymerization catalyst is added to a solution of the resin feed in the aromatic diluent or "reverse addition" where the resin feed is added to a slurry of the catalyst in the diluent, may be employed.

The resin feeds preferred to use in this invention are obtained by steam-cracking a light naphtha boiling from about 120° to 350° F. in the presence of 50–90 mol percent steam at temperatures of about 1000° to 1500° F. The steam-cracked fraction boiling from about 60° to 120° F. is the suitable resin feed. Optionally, certain components such as cyclopentadienes and 2-methyl butene-1 are removed from the resin feed prior to polymerization. The cyclopentadienes, which sometimes tend to degrade the resin color but improve resin softening point, may be removed if desired by heat treating the 60°–120° F. fraction to dimerize the cyclopentadienes and then distilling the mixture to remove the dimers. The 2-methyl butene-1, which degrades the resin softening point, may be removed by careful fractional distillation to remove the 86° to 90° F. fraction.

The above $C_5$ or $C_5$–$C_6$ steam-cracked naphtha fractions generally have a composition which ranges as follows (in the following formulae R is an alkyl group):

| Component | Wt. Percent |
|---|---|
| $C_5$ Diolefins | 10 to 30. |
| $C_5$ Olefins: | |
| Type I, $CH_2=CHR$ | 10 to 30. |
| Type II, $RCH=CHR$ | 10 to 30. |
| Type III, $CH_2=C\begin{matrix}R\\R\end{matrix}$ | 10 to 30. |
| Type IV, $RCH=C\begin{matrix}R\\R\end{matrix}$ | 3 to 10. |
| $C_5$ Paraffins | 15 to 40. |
| $C_6$ Components | 0 to 5. |

Of course, any $C_5$ or $C_5$–$C_6$ steam-cracked petroleum fraction boiling within the range of about 60° to 120° F. and having a composition within the above ranges, is suitable for this invention; as to olefin types, see U.S. Patent 2,625,527, column 2, and C. E. Boord, "The Science of Petroleum," vol. II, Oxford Univ. Press, p. 1349 (1938).

For example, the $C_5$ cut from a typical steam-cracked $C_6$—220° F. Kuwait naphtha, after substantial cyclopentadiene removal, has the following composition.

| Component: | Wt. percent |
|---|---|
| $C_5$ diolefins | 17.1 |
| $C_5$ olefins— | |
| Type I | 19.6 |
| Type II | 18.9 |
| Type III | 14.4 |
| Type IV | 6.5 |
| Paraffins | 23.0 |
| $C_6+$ components | 0.5 |
| | 100.0 |

The polymerization is carried out at temperatures between —40° to +160° F., preferably at 75° to 110° F., using about 0.25 to 3%, preferably 1 to 1.5% of a Friedel-Crafts catalyst such as $AlCl_3$, $BF_3$, etc., based on cracked naphtha being treated. When the direct addition technique is employed the $AlCl_3$ catalyst may be added as a finely divided solid or in solution with a catalyst promoter such as methyl, ethyl, or t-butyl chloride, etc. When reverse addition is used, the resin feed may be added to the slurry of powdered $AlCl_3$ in the diluent which may also contain small amounts of a promoter if desired. The polymerization is usually carried out at atmospheric pressure, but at the higher temperatures it is desirable to increase the pressure sufficiently to keep the monomers in the liquid phase. Accordingly, when polymerizing at 160° F. a pressure of about 5 atmospheres is desirable.

Upon completion of the reaction the catalyst is destroyed by adding water or methyl alcohol or the like. The catalyst and quenching medium are separated from the resin solution by simple gravity separation, filtration, or the like. The resin solution is washed with water, caustic, an aqueous solution of sodium carbonate or the like to remove final traces of catalyst. The cycloparaffin diluent and unreacted naphtha are distilled from the resin solution at atmospheric pressure. The liquid polymer or "fill" is finally removed by vacuum distillation. The desired hydrocarbon resin constitutes the bottoms from this final distillation. The yield and softening point are largely dependent upon the severity of this final stripping step, with the yield decreasing and the softening point increasing with increased severity of stripping.

to a 1 liter round bottom flask. The admixture was maintained for two hours in the flask at 95° F. The reaction mass was then quenched by adding 20 ml. (10 vol. percent) of a solution of 1 wt. percent Ethofat, a nonionic wetting agent, in distilled water, and stirring the mixture for about 30 minutes at 95° F. The aqueous phase was decanted off, the remaining mixture was agitated with 20 ml. (10 vol. percent) of 10 wt. percent sodium carbonate, and the aqueous phase was removed. The crude resin solution was charged to a one liter Claisen flask equipped with a thermometer, and the solution was distilled to 392° F. liquid temperature at atmospheric pressure. The overhead resin raffinate was discarded, and the remaining resin solution was then distilled to 518° F. liquid temperature at 5-6 mm. Hg. The flask containing the finished resin was weighed for yield determinations while still hot, after the vacuum had been released. The overhead liquid polymer or "fill" material was recovered and weighed. The hot, finished resin was poured into a heated ring for softening point determination.

The results are tabulated in Table I.

*Table I*

| Run | A | B | C | D | E | F |
|---|---|---|---|---|---|---|
| Resin feed, gm | 200 | 300 | 300 | 200 | 300 | 200. |
| AlCl₃, gm | 2 | 3 | 3 | 3 | 3 | 3. |
| Diluent | None | n-heptane | VM & P naptha | Varsol | Benzene | Cyclohexane. |
| Gm | | 41 | 150 | 100 | 150 | 100. |
| Resin Yield, Wt. Percent ᵃ | 30.3 | 29.9 | 23.4 | 35.3 | 33.7 | 45. |
| Gel formation, Wt. Percent ᵃ | 13.5 | 13.1 | 5.4 | 6.6 | 0.4 | None |
| Resin properties: | | | | | | |
| Softening Point, °C.ᵇ | 70 | 79 | 73.5 | 70 | 74 | 86. |
| Color, Gardner ᶜ | 2 | 1 | 1 | 1 | 1 | 1. |

ᵃ Wt. Percent based on resin feed.
ᵇ Ring and Ball, ASTM E-28-51 T.
ᶜ Gardner, 20 wt. percent resin in xylene.

The invention will be further illustrated by the following examples.

Unless otherwise designated, all percentages and ratios are given on a weight basis through this applicaiton.

EXAMPLE I

A blend of $C_5$-$C_6$ steam-cracked petroleum gas oil fractions, having an initial boiling point of 60° F. and from which the cyclodienes had been substantially removed following a dimerization step, had the following composition:

| Component: | Wt. percent |
|---|---|
| $C_5$ diolefins | 17.7 |
| $C_5$ olefins— | |
| Type I | 22.7 |
| Type II | 17.5 |
| Type III | 12.9 |
| Type IV | 6.5 |
| $C_5$ paraffins | 21.8 |
| $C_6+$ components | 0.9 |
| | 100.0 |

The above blend was prepared from available steam-cracked gas oils to simulate a $C_5$ fraction of a typical steam-cracked light naphtha stream. It will be noted that the composition of the blend is almost identical to that of the typical steam-cracked Kuwait light naphtha shown hereinbefore.

The above blend was polymerized in this example without a diluent (run A), with n-heptane as a diluent (run B), with VM & P naphtha as a diluent (run C), with Varsol, a partially aromatic solvent, as a diluent (run D), with benzene as a diluent (run E), and with cyclohexane as a diluent (run F).

In each run of this example, a portion of the above blend was admixed with aluminum chloride and charged to a 1 liter round bottom flask.

It is readily observed from Table I that the gel formation is considerable when no diluent is used or when a nonaromatic diluent is used. When benzene or cyclohexane is used, on the other hand, the gel formation is negligible. Furthermore, with cyclohexane, both resin yield and softening point are improved considerably.

Having described the general nature and several specific embodiments of the present invention, the true scope is now particularly pointed out in the appended claims.

What is claimed is:

1. A method for producing a petroleum resin from a steam-cracked, light naphtha, petroleum fraction comprising $C_5$ and $C_6$ aliphatic hydrocarbons which comprises contacting said petroleum fraction with a Friedel-Crafts catalyst in an amount of about 0.25–3 wt. percent based on the feed fraction in the presence of a liquid cycloparaffinic hydrocarbon diluent, utilized in amount of 5 to 50 wt. percent based on the feed fraction, in a polymerization zone at a temperature between —40° and +160° F. for a period sufficient to produce a high quality petroleum resin.

2. A method for producing a petroleum resin from a steam-cracked, light naphtha, petroleum fraction boiling substantially between 60° and 120° F. which comprises: contacting said petroleum fraction with an aluminum halide catalyst in an amount of about 0.25–3 wt. percent based on the feed fraction and about 10 to 30 wt. percent, based on said petroleum fraction, of a liquid cycloparaffinic hydrocarbon diluent at a temperature between about —40° and +160° F. for a period sufficient to produce a high quality petroleum resin.

3. A method according to claim 2 wherein the diluent is cyclohexane.

4. A method according to claim 2 wherein the diluent is cycloheptane.

5. A continuous method for producing petroleum resins from a steam-cracked light naphtha fraction boiling substantially between 60° and 120° F. and having the following composition:

| | Wt. Percent |
|---|---|
| $C_5$ diolefins | 10 to 30. |
| $C_5$ olefins: | |
|   Type I, $CH_2=CHR$ | 10 to 30. |
|   Type II, $RCH=CHR$ | 10 to 30. |
|   Type III, $CH_2=C\genfrac{}{}{0pt}{}{R}{R}$ | 10 to 30. |
|   Type IV, $RCH=C\genfrac{}{}{0pt}{}{R}{R}$ | 3 to 10. |
| $C_5$ paraffins | 15 to 40. |
| $C_6$ components | 0 to 5. | wherein R is an alkyl group, which comprises feeding said fraction, 0.25 to 3.0 wt. percent $AlCl_3$ catalyst, and 10 to 30 wt. percent cyclohexane diluent, based on said fraction, to a polymerization zone maintained at a temperature between −40° and +160° F.; passing the resulting polymerization mixture to a quenching zone where the reaction is quenched and the $AlCl_3$ catalyst is separated from said mixture; passing said mixture to a stripping zone where said cyclohexane diluent and unreacted hydrocarbons are stripped from the polymerization products; passing said products to a vacuum distillation zone where the liquid polymer product is stripped from said products; and recovering the resulting solid petroleum resin product.

6. A method according to claim 5 wherein substantially all the cyclodienes are removed from said fraction prior to polymerization.

References Cited in the file of this patent

UNITED STATES PATENTS

| | | |
|---|---|---|
| 1,982,708 | Thomas et al. | Dec. 4, 1934 |
| 2,775,576 | Hammer et al. | May 20, 1953 |
| 2,827,447 | Nowlin et al. | Mar. 18, 1958 |
| 2,834,768 | Friedlander | May 13, 1958 |
| 2,850,488 | Baxter | Sept. 2, 1958 |